(12) United States Patent
Barcus et al.

(10) Patent No.: US 7,258,763 B2
(45) Date of Patent: *Aug. 21, 2007

(54) TEMPORARY WET STRENGTH ADDITIVES

(75) Inventors: Robert Lee Barcus, Cincinnati, OH (US); Khosrow Parviz Mohammadi, West Chester, OH (US); Angela Marie Leimbach, Hamilton, OH (US); Stephen Robert Kelly, Owenton, KY (US)

(73) Assignee: The Procter + Gamble Company, Cincinnati, OH (US)

( * ) Notice: Subject to any disclaimer, the term of this patent is extended or adjusted under 35 U.S.C. 154(b) by 75 days.

This patent is subject to a terminal disclaimer.

(21) Appl. No.: 10/958,016

(22) Filed: Oct. 4, 2004

(65) Prior Publication Data

US 2005/0082024 A1   Apr. 21, 2005

Related U.S. Application Data

(63) Continuation-in-part of application No. 10/687,381, filed on Oct. 16, 2003, now Pat. No. 7,125,469.

(51) Int. Cl.
| | |
|---|---|
| D21H 17/33 | (2006.01) |
| D21H 21/20 | (2006.01) |
| C08F 16/02 | (2006.01) |
| C08F 18/10 | (2006.01) |

(52) U.S. Cl. .......... 162/123; 162/158; 162/164.1; 162/168.1; 526/304; 526/307.5; 526/328.5

(58) Field of Classification Search .......... 162/123, 162/158, 164.1, 168.1; 526/304, 307.5, 328.5
See application file for complete search history.

(56) References Cited

U.S. PATENT DOCUMENTS

| | | | |
|---|---|---|---|
| 3,317,370 A * | 5/1967 | Kekish .......... 162/168.4 |
| 3,347,832 A * | 10/1967 | Mills .......... 526/263 |
| 4,603,176 A | 7/1986 | Bjorkquist et al. |
| 4,753,710 A * | 6/1988 | Langley et al. .......... 162/164.3 |
| 4,866,151 A * | 9/1989 | Tsai et al. .......... 527/300 |
| 4,913,775 A * | 4/1990 | Langley et al. .......... 162/164.3 |
| 4,981,557 A | 1/1991 | Bjorkquist et al. |
| 5,008,344 A | 4/1991 | Bjorkquist |
| 5,039,764 A * | 8/1991 | Steinwand .......... 526/80 |
| 5,085,736 A | 2/1992 | Bjorkquist |
| 5,138,002 A | 8/1992 | Bjorkquist |
| 5,401,810 A * | 3/1995 | Jansma et al. .......... 525/385 |
| 5,490,904 A * | 2/1996 | Jansma et al. .......... 162/168.2 |
| 5,830,320 A | 11/1998 | Park et al. |
| 5,955,567 A | 9/1999 | Bigorra Llosas et al. |
| 6,130,303 A | 10/2000 | Neff et al. |
| 6,149,769 A | 11/2000 | Mohammadi et al. |
| 6,197,919 B1 * | 3/2001 | Crisp et al. .......... 528/230 |
| 6,281,291 B1 | 8/2001 | Bazaj et al. |
| 6,322,665 B1 | 11/2001 | Sun et al. |
| 6,494,990 B2 | 12/2002 | Bazaj et al. |
| 2002/0104633 A1 | 8/2002 | Sun et al. |
| 2003/0022568 A1 | 1/2003 | Branham et al. |
| 2003/0026963 A1 | 2/2003 | Chang et al. |
| 2003/0032352 A1 | 2/2003 | Chang et al. |
| 2003/0088014 A1 * | 5/2003 | Edwards et al. .......... 524/523 |

FOREIGN PATENT DOCUMENTS

| | | |
|---|---|---|
| GB | 2 324 615 | 10/1998 |
| WO | WO 00/11046 | 3/2000 |
| WO | WO 01/36491 A1 | 5/2001 |
| WO | WO 01/38638 A1 | 5/2001 |
| WO | WO 02/101144 A1 | 12/2002 |

OTHER PUBLICATIONS

"Thermal Transitions of Homopolymers: Glass Transitions (Tg) & Melting Point (Tm) Temperatures", [online]. Brochure, Sigma Aldrich Corporation, [retrieved on Jun. 20, 2006] retrieved from the Internet, URL:<http://www.sigmaaldrich.com/aldrich/brochure/al_pp_transitions.pdf>).*

Huang et al, "Polymerization of Diallyldimethylammonium chloride in Inverse Emulsion, II" Die Angewandte Makromolekulare Chemie, 165, (1989) p. 5, 2nd to last par.*

* cited by examiner

*Primary Examiner*—Steven P. Griffin
*Assistant Examiner*—Dennis R. Cordray
(74) *Attorney, Agent, or Firm*—C. Brant Cook; Betty J. Zea; David M. Weirich

(57) ABSTRACT

Temporary wet strength additives, more particularly, temporary wet strength additives comprising a polymer backbone, wherein the polymer backbone comprises a co-crosslinking monomeric unit, preferably a reversible co-crosslinking monomeric unit, especially in the presence of water, a homo-crosslinking monomeric units and a cationic monomeric unit, fibrous structures comprising such temporary wet strength additives, sanitary tissue products comprising such fibrous structures and processes for making such fibrous structures and/or such sanitary tissue product. Such fibrous structures and sanitary tissue products exhibit high initial wet tensile strength and improved flushability and/or reduced-clogging properties.

13 Claims, No Drawings

TEMPORARY WET STRENGTH ADDITIVES

CROSS REFERENCE TO RELATED APPLICATIONS

This application is a continuation-in-part application of U.S. application Ser. No. 10/687,381 filed Oct. 16, 2003 now U.S. Pat. No. 7,125,469.

FIELD OF THE INVENTION

The present invention relates to temporary wet strength additives, more particularly, to temporary wet strength additives comprising a polymer backbone, wherein the polymer backbone comprises a co-crosslinking monomeric unit, preferably a reversible co-crosslinking monomeric unit, especially in the presence of water, a homo-crosslinking monomeric unit and a cationic monomeric unit, fibrous structures comprising such temporary wet strength additives, sanitary tissue products comprising such fibrous structures and processes for making such fibrous structures and/or such sanitary tissue product. Such fibrous structures and sanitary tissue products exhibit high initial wet tensile strength and improved flushability and/or reduced-clogging properties.

BACKGROUND OF THE INVENTION

Wet strength is a desirable attribute of many disposable sanitary tissue products that come into contact with aqueous fluids during use, such as napkins, paper towels, household tissues (for example, facial and/or toilet tissue), disposable hospital wear, etc. In particular, it is often desirable that such sanitary tissue products have sufficient wet strength to enable their use in a moistened or wet condition. However, sanitary tissue products containing temporary wet strength additives, such as toilet tissue, must be capable of decaying in a relatively short amount of time so that they do not clog sewage systems and/or septic tanks.

Accordingly, the use of temporary wet strength additives in sanitary tissue products requires balancing sufficient wet strength of the sanitary tissue product during use with the ability of the sanitary tissue product to decay rapidly and effectively in an aqueous environment after use. In particular, there is a need for sanitary tissue products that maintain a greater percentage of their dry strength when they are first wetted, while, on further and/or subsequent exposure to water and/or other aqueous solutions, show a substantial decay, preferably rapidly and effectively, of their initial wet strength such that the used sanitary tissue product effectively flushes thus mitigating clogging of sewage systems and/or septic tanks.

SUMMARY OF THE INVENTION

The present invention fulfills the need described above by providing a fibrous structure comprising a temporary wet strength additive such that the fibrous structure and/or sanitary tissue product made therefrom exhibits sufficient flushability and/or decaying properties, especially in the presence of water and/or other aqueous solutions.

In one aspect of the present invention, a temporary wet strength additive comprising a polymer backbone comprising a co-crosslinking monomeric unit, a homo-crosslinking monomeric unit and a cationic monomeric unit is provided.

In another aspect of the present invention, a temporary wet strength additive exhibiting a Tg of less than about 100° C. is provided. Tg is determined using differential scanning calorimetry. In one embodiment, a temporary wet strength additive exhibiting a glass transition temperature, "Tg", of from about 45° C. to about 100° C. is provided. In another embodiment, a temporary wet strength additive exhibiting a Tg of from about 50° C. to about 95° C. is provided. In still another embodiment, a temporary wet strength additive exhibiting a Tg of from about 55° C. to about 90° C. is provided. In even still another embodiment, a temporary wet strength additive exhibiting a Tg of from about 60° C. to about 85° C. is provided.

In yet another aspect of the present invention, a fibrous structure comprising a temporary wet strength additive according to the present invention is provided.

In even yet another aspect of the present invention, a sanitary tissue product comprising a fibrous structure of the present invention is provided.

In still another aspect of the present invention, a process for making a fibrous structure of the present invention is provided.

In still another aspect of the present invention, a process for making a sanitary tissue product of the present invention is provided.

In even another aspect of the present invention, a method for making a temporary wet strength additive in accordance with the present invention is provided.

Accordingly, the present invention provides novel temporary wet strength additives, fibrous structures and/or sanitary tissue products comprising such temporary wet strength additives, processes for making such fibrous structures and/or sanitary tissue products, processes for making such temporary wet strength additives and fibrous structures and/or sanitary tissue products comprising such temporary wet strength additives that exhibit improved flushability and/or reduced-clogging as compared to fibrous structures and/or sanitary tissue products that contain prior art temporary wet strength additives.

DETAILED DESCRIPTION OF THE INVENTION

Definitions

"Fibrous structure" as used herein means a substrate formed from non-woven fibers. The fibrous structure of the present invention may be made by any suitable process, such as wet-laid, air-laid, sponbond processes. The fibrous structure may be in the form of one or more plies suitable for incorporation into a sanitary tissue product and/or may be in the form of non-woven garments, such as surgical garments including surgical shoe covers, and/or non-woven paper products such as surgical towels and wipes.

"Fiber" as used herein means an elongate particulate having an apparent length greatly exceeding its apparent width, i.e. a length to diameter ratio of at least about 10. More specifically, as used herein, "fiber" refers to papermaking fibers. The present invention contemplates the use of a variety of papermaking fibers, such as, for example, natural fibers or synthetic fibers, or any other suitable fibers, and any combination thereof. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. No. 4,300,981 and U.S. Pat. No. 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking. In addition to the above, fibers and/or filaments made from polymers, specifically hydroxyl polymers may be used in the present invention. Nonlimiting examples of suitable hydroxyl polymers include polyvinyl alcohol, starch, starch derivatives, chitosan, chitosan derivatives, cellulose derivatives, gums, arabinans, galactans and mixtures thereof.

"Sanitary tissue product" as used herein means a soft, low density (i.e. < about 0.15 g/cm$^3$) web useful as a wiping implement for post-urinary and post-bowel movement cleaning (toilet tissue), for otorhinolaryngological discharges (facial tissue), and multi-functional absorbent and cleaning uses (absorbent towels).

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself.

"Basis Weight" as used herein is the weight per unit area of a sample reported in lbs/3000 ft$^2$ or g/m$^2$. Basis weight is measured by preparing one or more samples of a certain area (m$^2$) and weighing the sample(s) of a fibrous structure according to the present invention and/or a paper product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples (m$^2$). The basis weight (g/m$^2$) is calculated by dividing the average weight (g) by the average area of the samples (m$^2$).

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121. Unless otherwise specified, all molecular weight values herein refer to the weight average molecular weight.

"Co-crosslinking" as used herein means a reaction between the temporary wet strength additive of the present invention and a fiber whereby the temporary wet strength additive is covalently bonded to the fiber.

"Homo-crosslinking" as used herein means a reaction between the temporary wet strength additive of the present invention and another temporary wet strength additive of the present invention or a conventional temporary wet strength additive wherein the temporary wet strength additives are covalently bonded to one another.

"Electrophilic moiety" as used herein means a moiety which is capable of accepting electrons from a nucleophilic moiety in order to form a covalent bond between the nucleophilic moiety and itself.

"Nucleophilic moiety" as used herein means a moiety which is capable of forming a covalent bond with an electrophilic moiety under chemical and/or physical conditions conventionally experienced during fibrous structure-making and/or sanitary tissue product-making processes and/or during storage and/or use of fibrous structures and/or sanitary tissue products comprising the temporary wet strength additives of the present invention.

"Unstable, covalent bond" as used herein means a covalent bond that is reversible in the presence of water and/or an aqueous fluid. A nonlimiting example of an unstable, covalent bond is a hemi-acetal bond formed by reacting a hydroxyl moiety with an aldehyde moiety.

"Stable, covalent bond" as used herein means a covalent bond that is not reversible in the presence of water and/or an aqueous fluid. A nonlimiting example of a stable, covalent bond is an amidol bond formed by reacting an amide moiety with an aldehyde moiety.

"Non-nucleophilic moiety" as used herein means a moiety which is not capable of reacting with an electrophilic moiety to form a covalent bond under chemical and/or physical conditions conventionally experienced during fibrous structure-making and/or sanitary tissue product-making processes and/or during storage and/or use of fibrous structures and/or sanitary tissue products comprising the temporary wet strength additives of the present invention.

"Decay" as used herein means the percent loss of wet tensile strength.

Fibrous Structures/Sanitary Tissue Products

The fibrous structure (web) of the present invention may be incorporated into a single-ply or multi-ply sanitary tissue product.

The fibrous structure may be foreshortened, such as via creping and/or microcontraction and/or rush transferring, or non-forshortened, such as not creping; creped from a cylindrical dryer with a creping doctor blade, removed from a cylindrical dryer without the use of a creping doctor blade, or made without a cylindrical dryer.

The fibrous structures of the present invention are useful in paper, especially sanitary tissue paper products including, but not limited to: conventionally felt-pressed tissue paper; pattern densified tissue paper; and high-bulk, uncompacted tissue paper. The tissue paper may be of a homogenous or multilayered construction; and tissue paper products made therefrom may be of a single-ply or multi-ply construction. The tissue paper preferably has a basis weight of between about 10 g/m$^2$ and about 120 g/m$^2$, and density of about 0.60 g/cc or less. Preferably, the basis weight will be below about 35 g/m$^2$; and the density will be about 0.30 g/cc or less. Most preferably, the density will be between about 0.04 g/cc and about 0.20 g/cc.

The fibrous structure may be selected from the group consisting of: through-air-dried fibrous structures, differential density fibrous structures, wet laid fibrous structures, air laid fibrous structures, conventional fibrous structures and mixtures thereof.

The fibrous structure may be made with a fibrous furnish that produces a single layer embryonic fibrous web or a fibrous furnish that produces a multi-layer embryonic fibrous web.

The fibrous structures of the present invention and/or paper products comprising such fibrous structures may have a total dry tensile of greater than about 59 g/cm (150 g/in) and/or from about 78 g/cm (200 g/in) to about 394 g/cm (1000 g/in) and/or from about 98 g/cm (250 g/in) to about 335 g/cm (850 g/in).

The fibrous structures of the present invention and/or paper products comprising such fibrous structures may have a total wet tensile strength of greater than about 9 g/cm (25 g/in) and/or from about 11 g/cm (30 g/in) to about 78 g/cm (200 g/in) and/or from about 59 g/cm (150 g/in) to about 197 g/cm (500 g/in).

A nonlimiting suitable process for making a fibrous structure of the present invention comprises the steps of providing a furnish comprising a plurality of cellulosic fibers and a wet strength agent; forming a fibrous structure from the furnish and heating/drying the fibrous structure to a temperature of at least about 40° C. and a moisture content of less than about 5%.

Fibrous Structure Additives

Any fibrous structure/sanitary tissue product additives, including wet strength additives, known to those skilled in the art may be incorporated into the fibrous structures and/or sanitary tissue products of the present invention so long as the fibrous structures/sanitary tissue products exhibit improved wet strength properties, as described herein, as compared to conventional fibrous structures/sanitary tissue products.

The temporary wet strength additives of the present invention can be used in any type of fibrous structure and/or sanitary tissue product construction. These include: pattern densified tissue paper such as, but not limited to, that disclosed in U.S. Pat. No. 3,301,746, Sanford and Sisson, issued Jan. 31, 1987, U.S. Pat. No. 3,974,025, Ayres, issued Aug. 10, 1976, U.S. Pat. No. 4,191,609, Trokhan, issued Mar. 4, 1980, U.S. Pat. No. 3,821,068, Shaw, issued Jun. 28, 1974, U.S. Pat. No. 3,573,164, Friedberg et al., issued Mar. 30, 1971, and U.S. Pat. No. 3,994,771, Morgan et al., issued Nov. 30, 1976, all incorporated by reference herein; uncompacted, nonpattern-densified tissue paper such as, but not limited to, that disclosed in U.S. Pat. No. 3,812,000, Salvucci et al., issued May 21, 1974 and U.S. Pat. No. 4,208,459, Becker et al., issued Jun. 17, 1980, both incorporated by reference herein; and conventional tissue paper well known in the art, typically made by pressing a wet web at elevated temperatures to dewater and dry said web.

The temporary wet strength additives of the present invention are useful for a wide variety of paper and paper products. As used herein, the terms "paper" and "paper products" include sheet-like masses and molded products containing fibrous cellulosic materials which may be derived from natural sources, such as wood pulp fibers, as well as other fibrous material characterized by having hydroxyl groups attached to the polymer backbone. These include glass fibers and synthetic fibers modified with hydroxyl groups. Cellulosic fibers are preferred. In addition, the present invention encompasses papers made from combinations of cellulosic fibers, or other fibers having hydroxyl-substituted polymer chains, and other fibrous or nonfibrous materials known to the art. The paper products of the present invention preferably contain at least about 70%, more preferably at least about 85%, by weight (dry sheet product basis), cellulosic fibers. Suitable nonfibrous additions are described in Young, "Fiber Preparation and Approach Flow" Pulp and Paper Chemistry and Chemical Technology, Vol. 2, pp. 881-882, which is incorporated herein by reference.

The temporary wet strength additives of the present invention are particularly useful for nonwoven tissue paper products containing cellulosic fibers such as toilet paper, facial tissue, and paper towels. These products will typically have basis weights of between about 8 g/m$^2$ and about 65 g/m$^2$, and densities of between about 0.03 g/cm$^3$ and about 0.60 g/cm$^3$. They can be made according to any of the techniques known to the art.

In forming fibrous structures and/or sanitary tissue products, the temporary wet strength additives of the present invention are preferably added as dilute aqueous solutions at any point in the papermaking process where temporary wet strength additives are customarily added.

The temporary wet strength additives typically are readily absorbed by the cellulose fibers in an aqueous environment at pH values within the range of about 3.5 to about 8.0. The wet strength additives can develop wet strength in fibrous structures and/or sanitary tissue products within this pH range.

Typically, the temporary wet strength additive of the present invention develops its wet strength in fibrous structures and/or sanitary tissue products both at room temperature and at temperatures at which paper is conventionally dried or through-air dried (190° F.-250° F./87° C.-121° C.).

While Applicants do not wish to be bound by theory, it is believed that wet strength in the fibrous structures and/or sanitary tissue products of the present invention is generated by the formation of hemiacetal bonds, which form when the temporary wet strength additive of the present invention bonds to the cellulose (co-crosslinking); and by hemiacetal bonds, which form when the temporary wet strength additive that is attached to one cellulose fiber bonds to a hydroxyl moiety of another temporary wet strength additive that is attached to another fiber (homo-crosslinking). In order to lose wet strength, these same two bonds must break. By controlling the relative number of these bonds, the wet tensile strength and the rate of tensile decay of the cellulose product upon wetting can be controlled.

In forming fibrous structures and/or sanitary tissue products of the present invention, the temporary wet strength additives of the present invention can be added as dilute aqueous solutions at any point in the papermaking process where temporary wet strength additives are customarily added. Such nonfibrous additions are described in Young, "Fiber Preparation and Approach Flow" Pulp and Paper Chemistry and Chemical Technology, Vol. 2, pp 881-882, which is incorporated by reference.

The temporary wet strength additive of the present invention can be applied to the fibrous slurry and/or in-line in a fibrous structure making machine (i.e., papermaking machine) and/or in the furnish, and/or to the embryonic fibrous web and/or fibrous structure and/or sanitary tissue product of the present invention as it is being made on a papermaking machine or thereafter: either while it is wet (i.e., prior to final drying) or dry (i.e., after final drying). Application methods for applying the temporary wet strength additive may include spraying on to the embryonic fibrous web directly or contacting the foraminous wire and/or fabric and/or belt which contacts the web with the temporary wet strength additive, such as by spraying and/or dipping and/or slot extruding and/or brushing on.

A substantial amount of initial wet strength is imparted to the fibrous structures and/or sanitary tissue products of the present invention when from about 0.005% to about 2% of the temporary wet strength additive by weight of the fiber is added. Typically, best results, i.e., around 50% of tensile decay at 5 minutes and around 80% at 30 minutes, are achieved when about 0.1% to about 0.3% of the temporary wet strength additive by weight of the fiber is added, and when from 30 mole percent to about 85 mole percent of the homo-crosslinking monomeric unit is present in the temporary wet strength additive. When lower levels of this homo-crosslinking monomeric unit are added, there is an insufficient amount of wet tensile decay over time. When greater than 85% of the non-nucleophilic monomeric unit is present, the fibrous structures and/or sanitary tissue products of the present invention do not exhibit good initial wet strength.

A nonlimiting example of a suitable wet strength additive for use in the fibrous structures and/or sanitary tissue products of the present invention includes temporary wet strength additives described herein.

Temporary Wet Strength Additives

Nonlimiting examples of suitable temporary wet strength additives for use in the fibrous structures of the present invention generally have weight average molecular weights of from about 20,000 to about 400,000 and/or from about 50,000 to about 400,000 and/or from about 70,000 to about 400,000 and/or from about 70,000 to about 300,000 and/or from about 100,000 to about 200,000.

In forming fibrous structures and/or sanitary tissue products of the present invention, wet strength additives, if present, can be added as dilute aqueous solutions at any point in the papermaking process where wet strength additives are customarily added. Such nonfibrous additions are described in Young, "Fiber Preparation and Approach Flow" Pulp and Paper Chemistry and Chemical Technology, Vol. 2, pp 881-882, which is incorporated by reference.

In one embodiment, the fibrous structures of the present invention comprise from about 0.005% to about 5% and/or from about 0.1% to about 2% and/or from about 0.1% to about 1% by weight of the fiber.

The temporary wet strength additives of the present invention impart wet tensile strength properties and wet tensile decay properties to the fibrous structures and/or sanitary tissue products of the present invention.

It has been found that temporary wet strength additives with high weight average molecular weights (i.e. those in excess of 300,000) may decay unacceptably slow for consumer purposes. They may not achieve a wet tensile decay rate of better than 35-45% after 5 minutes and/or better than 50-65% after 30 minutes.

Further, it has been found that temporary wet strength additives with extremely low weight average molecular weights (i.e. those less than 70,000) may have very low wet strength and are may not be optimal as temporary wet strength additives for fibrous structures and/or sanitary tissue products.

The temporary wet strength additives in accordance with the present invention have the formula:

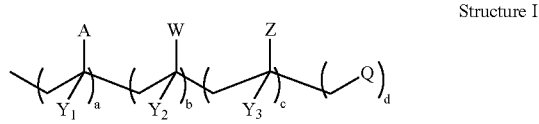

Structure I wherein: A (the moiety present on the co-crosslinking monomeric unit) is independently an electrophilic moiety, nonlimiting examples of which include the following:

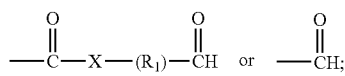

Z (the moiety present on the homo-crosslinking monomeric unit) is independently a nucleophilic moiety capable of forming an unstable covalent bond with the electrophilic moiety, nonlimiting examples of which include the following:

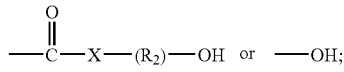

and X is independently —O—, —NH—, or —NCH$_3$—; and R$_1$ and R$_2$ are independently substituted or unsubstituted aliphatic groups; Y$_1$, Y$_2$, and Y$_3$ are independently —H, —CH$_3$, or a halogen; Q is a cationic moiety; and W is a non-nucleophilic moiety or a nucleophilic moiety that does not form a stable covalent bond with the electrophilic moiety. Nonlimiting examples of moieties for W include water-soluble nitrogen heterocyclic moieties and/or water-soluble carboxylic acid moieties.

The mole percent of a ranges from about 1% to about 47%, preferably from about 5% to about 30%, the mole percent of b ranges from about 0% to about 60%, preferably from about 0% to about 45%, the mole percent of c ranges from about 10% to about 90%, preferably from about 30% to about 80%, and d ranges from about 1% to about 40%, preferably from about 2% to about 20%, more preferably from about 5% to about 12%.

Unless otherwise expressly specified, values for a, b, c, and d shall be mole percentage values based upon the average number of monomeric units in the polymer backbone of the temporary wet strength additive of the present invention.

The monomeric units of the polymer backbone of the temporary wet strength additive of the present invention are randomly distributed throughout the polymer in ratios corresponding to the mole percentage ranges described herein.

Each class of monomeric units may include a single monomer or may include combinations of two or more different monomers within that class. The mole percent of each monomeric unit within a class of monomeric units may be independently selected.

a. Co-Crosslinking Monomeric Unit

The co-crosslinking monomeric unit of the temporary wet strength additives of the present invention comprises an electrophilic moiety and can be derived from a monomer having the following structure:

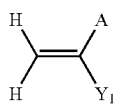

wherein Y$_1$ and A are as defined above. If A is:

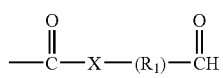

R$_1$ can be a substituted or unsubstituted, branched or linear aliphatic group. The aliphatic group preferably comprises a methylene or a C$_2$-C$_{18}$ chain, more preferably a methylene or a C$_2$-C$_7$ chain, even more preferably a methylene or a C$_2$ chain. Preferably, if R$_1$ is substituted, the substituent(s) will include an electron withdrawing functionality at the alpha-methylene position relative to the aldehyde moiety. Suitable electron withdrawing groups include, but are not limited to, halogens, such as chlorine, fluorine, and bromine; amides, such as —NHCOR' wherein each R' can independently be substituted or unsubstituted, branched or linear $C_1$-$C_{12}$ aliphatic groups; hydroxyl groups; alkoxy groups, preferably with $C_1$-$C_8$ alkyl chains; cyano groups, e.g., —CN; and nitro groups, e.g. —$NO_2$. The aldehyde functionality can optionally be chemically protected during polymerization by techniques well known in the art.

Nonlimiting examples of suitable co-crosslinking monomeric units include N-(2,2-dimethoxyethyl)-N-methyl acrylamide, acrolein, methacrolein, glyoxylated acrylamide, 3,3-dimethyoxypropyl acrylamide, 3,3 diethoxypropyl acrylamide, 3,3-dimethoxypropyl methacrylamide, 2,2 dimethoxy-1-methylethyl acrylate, 3,3-dimethoxypropyl methacrylate, 2-(acryloylamino)ethanal dimethylacetal, 2-(methacryloylamino)propanal dimethyl acetal, 5-(acryloylamino)pentanal dimethylacetal, 8-(acryloylamino)octanal dimethylacetal, and 3-(N-acryloyl-N-methylamino)propanal dimethyl acetal. N-(2,2-dimethoxyethyl)-N-methyl acrylamide is most preferred. Other suitable monomers are disclosed in U.S. Pat. No. 3,410,828, Kekish issued Nov. 12, 1986 and U.S. Pat. No. 3,317,370, Kekish, issued May 2, 1967, both of which patents are incorporated herein by reference.

b. Homo-Crosslinking Monomeric Units

The homo-crosslinking monomeric unit of the temporary wet strength additives of the present invention comprises a nucleophilic moiety capable of forming an unstable, covalent bond with an electrophilic moiety (i.e. aldehyde moiety present on a co-crosslinking monomeric unit). As a result of this unstable covalent bond, the nucleophilic moiety can crosslink together two or more temporary wet strength additives, at least one of which is a temporary wet strength additive of the present invention, via the unstable covalent bond formed between the nucleophilic moiety present on one temporary wet strength additive and the electrophilic moiety present on another temporary wet strength additive. So in other words, a mixture comprising only temporary wet strength additives of the present invention may be crosslinked together via the nucleophilic moiety, as described above, or a mixture of temporary wet strength additives of the present invention with other conventional temporary wet strength additives my be crosslinked together via the nucleophilic moiety present on the temporary wet strength additives of the present invention.

A nonlimiting example of a suitable nucleophilic moiety is a hydroxyl-containing moiety.

The homo-crosslinking monomeric unit of the temporary wet strength additives of the present invention, i.e. monomer units having Z attached thereto in Formula I, can be derived from a monomer having the following structure:

wherein $Y_3$ and Z are as defined above. If Z is:

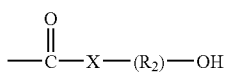

$R_2$ can be a substituted or unsubstituted, branched or linear aliphatic group. The aliphatic group preferably comprises a $C_2$-$C_{18}$ chain, more preferably a $C_2$-$C_7$ chain, even more preferably a $C_2$-$C_4$ chain. If Z is —OH, the hydroxyl group in the homo-crosslinking monomer unit should be chemically protected during polymerization by techniques well known in the art.

Nonlimiting examples of suitable homo-crosslinking monomeric units include the following: 2-hydroxyethyl acrylate, 2-hydroxyethyl methacrylate, 4-hydroxybutyl acrylate, glyceryl mono-methacrylate, glyceryl mono-acrylate, 2-hydroxypropyl acrylate 2-hydroxypropyl methacrylate, hydroxypropyl acrylate 4-hydroxybutyl methacrylate, diethylene glycol mono-methacrylate, sorbitol methacrylate, methyl 2-hydroxymethyl acrylate, 3-methyl butanol-2 methacrylate, 3,3-dimethyl butanol-2 methacrylate, ethyl 2-(hydroxymethyl)acrylate, N-2-hydroxyethyl methacrylamide, N-(2-hydroxypropyl) methacrylamide, 2-acrylamidoglycolic acid, poly(ethylene glycol) acrylate and acrylamidotrishydroxymethylmethane.

Further nonlimiting examples of homo-crosslinking monomer units include poly(ethylene glycol) acrylate having the formula:

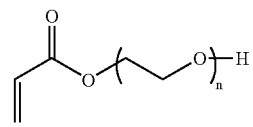

wherein n is an integer from 2 to 100, preferably 2 to 50, more preferably 2 to 30, and a homo-crosslin monomer unit having the formula:

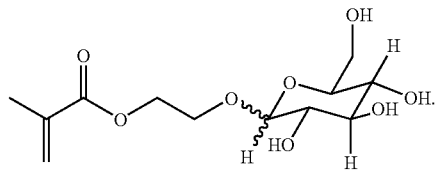

c. Cationic Monomeric Units

The cationic monomeric unit can be derived from any polymerizable monomer which imparts a positive charge to the temporary wet strength additive of the present invention subsequent to polymerization. Cationic monomer units may and preferably do carry a positive electrostatic charge when dissolved in water. Suitable counterions can include chloride, fluoride, bromide, iodide, sulphate, methylsulfate, phosphate and the like.

Nonlimiting examples of suitable cationic monomeric units include 3-(methacryloylamino)propyl trimethyl ammonium chloride, 2-vinyl-N-methylpyridinium chloride, diallyldimethyl ammonium chloride, (p-vinylphenyl)trimethyl ammonium chloride, 2-(dimethylamino)ethyl acrylate, 2-dimethylaminoethyl methacrylate, trimethyl(p-vinylbenzyl)ammonium chloride, p-dimethylaminoethylstyrene, dimethylaminopropyl acrylamide, 2-methylacrloyloxyethyltrimethyl ammonium methylsulfate, and 3-acrylamido-3-methylbutyl trimethyl ammonium chloride.

Further nonlimiting examples of the suitable cationic monomeric units of the present invention include:

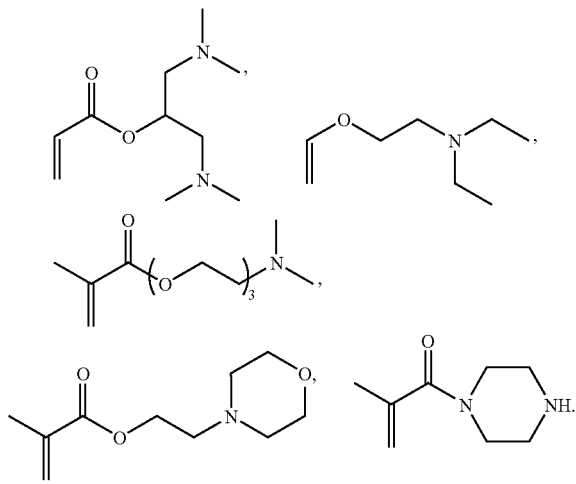

d. Non-Nucleophilic and/or Nucleophilic Monomeric Units

The non-nucleophilic and/or nucleophilic monomeric unit (the monomeric unit containing W) that does not form a stable covalent bond with the electrophilic moiety (i.e., aldehyde moiety present on a co-crosslinking monomeric unit) can optionally be incorporated into the temporary wet strength additive of the present invention.

The non-nucleophilic monomeric unit can be derived from a monomer having the following structure:

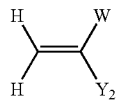

wherein W and $Y_2$ are as defined above, with $Y_2$ preferably being H. Preferably, W is hydrophilic. If W is a hydrophobic moiety, the amount incorporated (b) should be below levels that would result in a copolymer that is insoluble in water.

Nonlimiting examples of suitable non-nucleophilic monomeric units include nitrogen heterocyclic moiety-containing monomeric units, such as vinyl oxazolidones, vinyl imidazoles, vinyl imidazolines, vinyl pyridines, and vinyl pyrrolidones, such as N-vinyl pyrrolidone, 2-vinyl pyrrolidone, etc.

Other specific nitrogen heterocycles useful as monomeric unit starting reagents include N-vinyl-5-methyl-2-oxazolidine, N-vinyl-2-oxazolidone, N-vinyl pyrrolidone, N-vinyl imidazole, N-vinyl-2-methyl imidazole, 2-vinyl imidazole N-vinyl-3-morpholinone, N-vinyl caprolactam, etc. Preferred among these nitrogen heterocycles are the vinyl pyrrolidones.

Other nonlimiting examples of non-nucleophilic, hydrophilic monomeric units are N,N-dimethyl acrylamide and methoxy poly(ethylene glycol) methacrylate.

Nonlimiting examples of non-nucleophilc, hydrophobic monomeric units include alkyl, especially $C_1$-$C_4$, acrylate and methacrylate esters and styrenes.

Nonlimiting examples of suitable non-nucleophilic monomeric units include methyl methacrylate, methyl acrylate, ethyl acrylate, n-propyl acrylate, iso-propylacrylate, n-propyl methacrylate, ethyl methacrylate, iso-propylmethacrylate, n-butyl acrylate, isobutyl acrylate, isobutyl methacrylate, n-butyl methacrylate, α-methyl styrene, benzyl acrylate and ethylhexylacrylate.

In one embodiment, the non-nucleophilic, hydrophobic monomeric unit includes a butyl acrylate.

Nonlimiting examples of nucleophilic monomeric units that do not form stable covalent bonds with the electrophilic moiety include carboxylic acids. Nonlimiting examples of suitable carboxylic acids include $C_{3-8}$ monocarboxylic acids and $C_{4-8}$ dicarboxylic acids may be selected from the group consisting of acrylic acid, methacrylic acid, beta-acryloxypropionic acid, vinyl acetic acid, vinyl propionic acid, crotonic acid, ethacrylic acid, alpha-chloro acrylic acid, alpha-cyano acrylic acid, maleic acid, maleic anhydride, fumaric acid, itaconic acid, citraconic acid, mesaconic acid, methylenemalonic acid, their salts, and mixtures thereof.

More preferably, the $C_{3-8}$ monocarboxylic acids, $C_{4-8}$ dicarboxylic acids, their salts and mixtures thereof, may be selected from the group consisting of acrylic acid, methacrylic acid, maleic acid.

It has been surprisingly found that fibrous structures and/or sanitary tissue products comprising a wet strength additive, especially a temporary wet strength additive, more especially a temporary wet strength additive that comprises a non-nucleophilic monomeric unit, such as butyl acrylate and/or a homo-crosslinking monomeric unit comprising a poly(ethylene glycol) acrylate moiety, for example, minimizes the negative impact of creping on wet tensile of the fibrous structure and/or sanitary tissue product and/or improves the softness of the fibrous structure and/or sanitary tissue product as compared to a fibrous structure and/or sanitary tissue product having a wet strength additive other than those described herein.

Without being bound by theory, it is believed that the wet strength additives of the present invention exhibit a lower Tg than conventional wet strength additives and thus, as a result avoid fracturing during a creping process. By not fracturing during a creping process, loss of wet tensile in a fibrous structure and/or sanitary tissue product comprising such a wet strength additive, especially where the wet strength additive exhibits a Tg of less than about 100° C., is mitigated or inhibited.

The temporary wet strength additives of the present invention can be made by a wide variety of techniques, including bulk, solution, emulsion, or suspension polymerization. Polymerization methods and techniques for polymerization are described generally in Encyclopedia of Polymer Science and Technology, Interscience Publishers (New York), Vol. 7, pp. 361-431 (1967), and Kirk-Othmer Encyclopedia of Chemical Technology, 3rd edition, Vol 18, pp. 740-744, John Wiley & Sons (New York), 1982, both incorporated by reference herein. See also Sorenson, W. P. and Campbell, T. W., Preparative Methods of Polymer Chemistry. 2nd edition, Interscience Publishers (New York), 1968, pp. 248-251, incorporated by reference herein, for general reaction techniques suitable for the present invention. Preferably, the temporary wet strength additives are made by free radical copolymerization, using water soluble initiators. Suitable free radical initiators include, but are not limited to, thermal initiators, redox couples, and photochemical initiators. Redox and photochemical initiators are preferred for polymerization processes initiated at temperatures below about 30° C. (86° F.). Such initiators are described generally in Kirk-Othmer Encyclopedia of Chemical Technology, 3rd edition, John Wiley & Sons (New York), Vol. 13, pp. 355-373 (1981), incorporated by reference herein. Typical water soluble initiators that can provide radicals at 30° C. or below include redox couples, such as potassium persulfate/silver nitrate, and ascorbic acid/hydrogen peroxide. A preferred method utilizes thermal initiators in polymerization processes conducted above 40° C. (104° F.). Water soluble initiators that can provide radicals at 40° C. (104° F.) or higher can be used. These include, but are not limited to, hydrogen peroxide, ammonium persulfate, and 2,2'-azobis(2-amidinopropane) dihydrochloride. In one especially preferred method, water soluble starting monomers are polymerized in an aqueous alcohol solvent at 60° C. (140° F.) using 2,2'-azobis(2-amidinopropane) dihydrochloride as the initiator. The solvent should typically contain at least about 10% by volume, of alcohol in order to prevent the polymerization reaction medium from gelling. Suitable alcohols for use in such reaction include low molecular weight alcohols such as, but not limited to, methanol, ethanol, isopropanol, and butanol.

Another technique is a solution polymerization as described in U.S. Pat. No. 3,317,370, Kekish, issued May 2, 1967 and U.S. Pat. No. 3,410,828, Kekish, issued Nov. 12, 1968, both incorporated herein by reference. According to such process, the acrolein, or other aldehydic monomer, is copolymerized with a non-nucleophilic, water soluble, nitrogen-heterocyclic polymerizable monomer and a redox initiator system. The copolymer is then made cationic by reacting the copolymer with a water soluble amine or amine quaternary. Amines, including amine quaternaries, that are useful include, but are not limited to, primary, secondary, and tertiary amines such as ethylene diamine, diethylene triamine, triethylene tetramine, tetraethylene pentamine, or partial or fully quaternized derivatives of any of the foregoing, hydrazides and quaternaries thereof such as betaine hydrazide chloride, N—N-dimethylglycine hydrazide, unsymmetrical dimethyl hydrazides, polymers, such as those formed by reaction of urea and polyalkylene polyamines, guanidines, biguanides, guanylureas, mono and polyhydroxy polyamines and quaternaries thereof, etc. When using this emulsion copolymerization technique, it will be necessary to control molecular weight to within the ranges provided herein. Suitable methods for this are discussed below.

Generally, as the weight average molecular weight of the temporary wet strength additive is decreased, initial wet strength will become smaller and wet strength decay will become faster. The temporary wet strength additives of the present invention should have a molecular weight of at least about 20,000, preferably at least about 70,000. The upper limit for molecular weight will be limited by a combination of the ability of the additive to impart the desired level of strength decay, discussed further below, and practical considerations such as sufficiently low viscosity for application to pulp slurries or pulp sheets and technical and economic concerns related to formation of such high molecular weight additives. Generally, the molecular weight should be less than about 400,000, preferably less than about 300,000, and more preferably less than about 200,000.

Molecular weight can be controlled by such methods that are known to those skilled in the art, such as varying reaction temperature (increased temperature typically results in reduced molecular weight), varying free radical initiator concentration, and utilization of chain transfer agents. Suitable chain transfer agents include, but are not limited to, beta.-mercaptoethanol, thioglycolic acid, glycerol, acetone, and isopropanol. Other suitable chain transfer agents include, but are not limited to, those described in Polymer Handbook, 2nd edition, J. Brandrup and E. H. Immergut, editors, Wiley-Intersciences (New York), (1975), pp. II-57 through II-104, incorporated by reference herein.

NONLIMITING SYNTHESIS EXAMPLES

Example I

Preparation of a temporary wet strength additive in accordance with the present invention having the following structure:

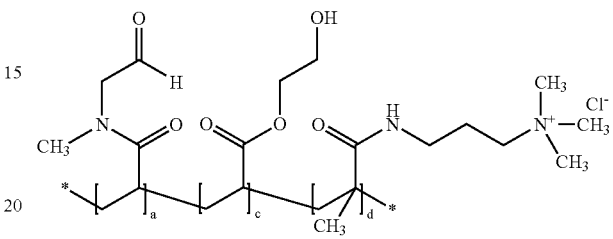

N-(2,2-dimethoxyethyl)-N-methyl acrylamide (1.006 g, 5.807 mmole), 2-hydroxyethyl acrylate (5.645 g, 48.58 mmole), [3-(methacryloylamino)propyl]trimethyl ammonium chloride (0.763 g, 3.46 mmole), 2,2'-azobis(2-amidinopropane) dihydrochloride (0.0475 g, 0.175 mmole), 2-propanol (5 ml), and water (45 ml) are added to a 250 ml round bottom flask containing a magnetic stir bar. This solution is sparged with Ar for 25 minutes and then the neck is fitted with a gas inlet adapter connected to an Ar manifold. The flask is heated for 20 hours at 60° C. in an oil bath. This polymer will have an acetal protecting group. A small analytical sample is reserved for gel permeation chromatography and proton NMR spectroscopy and then water (75 ml) and 1N HCl (14 ml) are added. The solution is heated at 40° C. for four hours under Ar to hydrolyze the protecting group. After cooling to room temperature, the solution is adjusted to pH 5 with 1 N NaOH and then dialyzed against water for 16 hours (Mw cut-off=3,500). The weight average molecular weight of this polymer will typically be about 140,000 and a, c, and d will typically be between about 9% to about 11%, between about 83% to about 85%, and between about 5% to about 7%, respectively. The Tg of this polymer will typically be about 77° C.

Example II

Preparation of a temporary wet strength additive in accordance with the present invention having the following structure:

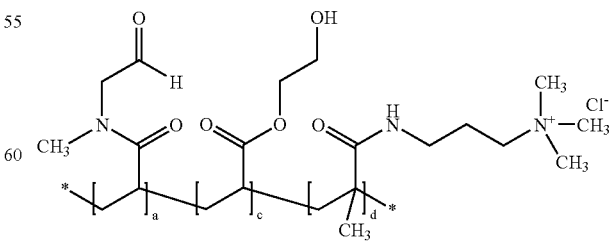

N-(2,2-dimethoxyethyl)-N-methyl acrylamide (61.54 g, 0.3553 mole), 2-hydroxyethyl acrylate (330.01 g, 2.842 mole), [3-(methacryloylamino)propyl]trimethyl ammonium chloride (78.41 g, 0.3552 mole), 2,2'-azobis(2-amidinopropane) dihydrochloride (2.891 g, 10.7 mmole), 2-propanol (230 ml), and water (2.83 L) are added to a 12 L three-necked, round bottom flask fitted with a mechanical stirrer, temperature probe, and a gas inlet adapter. This solution is sparged with Ar for 30 minutes and then heated from room temperature to 55° C., with constant stirring under Ar, at which point the reaction becomes exothermic. The reaction temperature is maintained between about 58° C. to about 65° C. until the reaction is no longer exothermic. The solution is heated at 60° C. for an additional 20 hours. This polymer will have an acetal protecting group. An analytical sample is reserved and characterized as described in Example I. The 2-propanol is removed in vacuo and then the viscous solution is transferred to a 22 L three necked, round bottom flask with water (5.74 L) and then concentrated HCl (77 ml) is added. The solution is heated at 40° C. for four hours under nitrogen to hydrolyze the protecting group. After cooling to room temperature, the solution is adjusted to pH 5 with NaOH. The weight average molecular weight of this polymer will typically be about 160,000 and a, c, and d will typically be between about 7% to about 11%, between about 80% to about 83%, and between about 9% to about 11%, respectively. The Tg of this polymer will typically be about 60° C.

Example III

Preparation of a temporary wet strength additive in accordance with the present invention having the following structure:

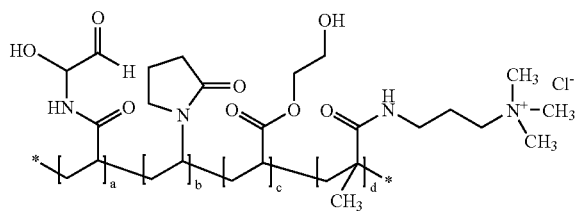

N-Vinylpyrrolindinone (202.60 g, 1.823 mole), 2-hydroxyethyl acrylate (70.55 g, 0.6076 mole), [3-(methacryloylamino)propyl]trimethyl ammonium chloride (67.07 g, 0.3038 mole), 2,2'-azobis(2-amidinopropane) dihydrochloride (8.23 g, 3.03 mmole), 2-propanol (525 ml), and water (2.1 L) are added to a 5 L three-necked, round bottom flask fitted with a mechanical stirrer, temperature probe, and a gas inlet adapter. This solution is sparged with Ar for 30 minutes and then acrylamide (21.59 g, 0.3037 mole) is added. The solution is then heated from room temperature to 58° C., with constant stirring under Ar, at which point the reaction becomes exothermic. The reaction temperature is maintained between about 58° C. to about 60° C. until the reaction is no longer exothermic. The solution is heated at 60° C. for an additional 20 hours. An analytical sample is reserved and characterized as described in Example I. The 2-propanol is removed in vacuo and then glyoxal (44.07 g of a 40% solution, 0.3037 mole) is added. The solution is maintained at pH 8 for 8 hours by the addition of 10% NaOH and then allowed to stir overnight at room temperature. The solution is then adjusted to pH 5 by the addition of 1N HCl. The weight average molecular weight of this polymer will typically be about 150,000 and a, b, c, and d will typically be between about 8% to about 11%, between about 59% to about 61%, between about 19% and 21%, and between about 9% to about 11%, respectively. The Tg of this polymer will typically be about 98° C.

Example IV

Preparation of a temporary wet strength additive in accordance with the present invention having the following structure:

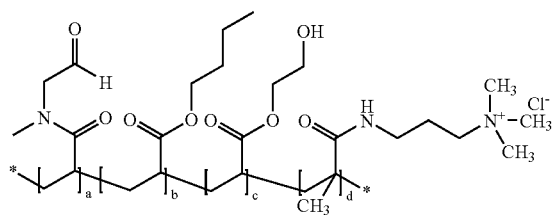

N-(2,2-dimethoxyethyl)-N-methyl acrylamide (45.71 g, 0.2369 mole), 2-hydroxyethyl acrylate (214.55 g, 1.8477 mole), [3-(methacryloylamino)propyl]trimethyl ammonium chloride (58.27 g, 0.2640 mole), n-butyl acrylate (33.83 g, 0.2682 mole) 2,2'-azobis(2-amidinopropane) dihydrochloride (2.147 g, 7.917 mmole), 2-propanol (152 ml), acetone (650 ml), and water (1.48 L) are added to a 5 L three-necked, round bottom flask fitted with a mechanical stirrer, temperature probe, and reflux condenser. This solution is sparged with Ar for 30 minutes and then heated from room temperature to 55° C., with constant stirring under Ar, at which point the reaction becomes exothermic. The reaction temperature is maintained between about 58° C. to about 60° C. until the reaction is no longer exothermic. The solution is heated at 60° C. for an additional 20 hours. This polymer will have an acetal protecting group. An analytical sample is reserved and characterized as described in Example I. The 2-propanol and acetone are removed in vacuo and then the viscous solution is transferred to a 12 L three necked, round bottom flask with water (2.9 L) and then concentrated HCl (49 ml) is added. The solution is heated at 40° C. for four hours under nitrogen to hydrolyze the protecting group. After cooling to room temperature, the solution is adjusted to pH 5 with NaOH. The weight average molecular weight of this polymer will typically be about 92,000 and a, b, c, and d will typically be between about 9% to about 11%, between about 9% and about 11%, between about 69% to about 71%, and between about 9% to about 11%, respectively. The Tg of this polymer will typically be about 75° C.

Example V

Preparation of a temporary wet strength additive in accordance with the present invention having the following structure:

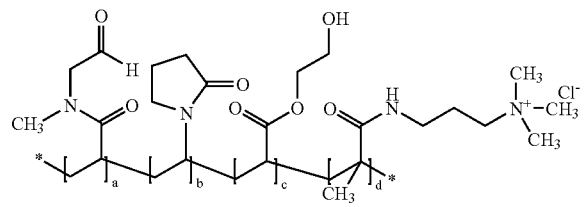

N-(2,2-dimethoxyethyl)-N-methyl acrylamide (0.997 g, 5.76 mmole), N-vinyl pyrrolidinone (1.925 g, 17.32 mmole), 2-hydroxyethyl acrylate (0.339 g, 2.92 mmole), [3-(methacryloylamino)propyl]trimethyl ammonium chloride (0.639 g, 2.89 mmole), 2,2'-azobis(2-amidinopropane) dihydrochloride (0.0778 g, 0.287 mmole), 2-propanol (5 ml), and water (20 ml) are added to a 100 ml round bottom flask containing a magnetic stir bar. This solution is sparged with Ar for 25 minutes and then the neck is fitted with a gas inlet adapter connected to an Ar manifold. The flask is heated for 20 hours at 60° C. in an oil bath. This polymer will have an acetal protecting group. An analytical sample is reserved and characterized as described in Example I and then the solution is transferred to a 250 ml round bottom flask with water (55 ml). 1N HCl (6.5 ml) is added and the solution is heated at 40° C. for four hours under Ar to hydrolyze the protecting group. After cooling to room temperature, the solution is adjusted to pH 5 with 1 N NaOH and then dialyzed against water for 16 hours (Mw cut-off=3, 500). The weight average molecular weight of this polymer will typically be about 260,000 and a, b, c, and d will typically be between about 18% to about 20%, between about 59% to about 61%, between about 9% to about 11%, and between about 9% to about 11%, respectively. The Tg of this polymer will typically be about 177° C.

Example VI

Preparation of a temporary wet strength additive in accordance with the present invention having the following structure:

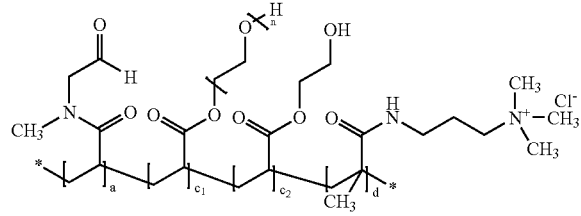

N-(2,2-dimethoxyethyl)-N-methyl acrylamide (29.00 g, 0.1674 mole), 2-hydroxyethyl acrylate (149.70 g, 1.289 mole), [3-(methacryloylamino)propyl]trimethyl ammonium chloride (36.96 g, 0.1674 mole), poly(ethyleneglycol) acrylate (18.84 g, 0.0502 mole) 2,2'-azobis(2-amidino-propane) dihydrochloride (1.37 g, 5.05 mmole), 2-propanol (250 ml), and water (1.42 L) are added to a 5 L three neck, round bottom flask fitted with an overhead stirrer and a temperature probe, and the solution was sparged with Ar for 30 min. The third neck was fitted with a gas inlet adapter connected to an Ar manifold. The solution was heated to 58° C. with a heating mantle. The reaction temperature is maintained between about 58° C. to about 60° C. until the reaction is no longer exothermic. The solution is heated at 58° C. for an additional 20 hours. This polymer will have an acetal protecting group. An analytical sample is reserved and characterized as described in Example I. The 2-propanol was removed in vacuo and then the viscous solution is transferred to a 12 L three necked, round bottom flask with water (1.74 L) and then concentrated HCl (30 ml) is added. The solution is heated at 40° C. for four hours under nitrogen to hydrolyze the protecting group. After cooling to room temperature, the solution is adjusted to pH 4 with NaOH. The weight average molecular weight of this polymer will typically be about 121,000 and a, c1, c2, and d will typically be between about 9% to about 11%, between about 2% and about 4%, between about 76% to about 78%, and between about 9% to about 11%, respectively. The Tg of this polymer will typically be about 67° C.

Test Methods

% Decay Test Method a. Sample Preparation—Handsheets

If a sample fibrous structure is not in existence, then a sample handsheet can be prepared to test % Decay. Handsheets can be formed from 100% unrefined Northern Softwood Kraft (NSK), mixtures of NSK and Eucalyptus, or from other fibers as desired. After dispersing the NSK, or other fibers, in water, a temporary wet strength resin is added to the disintegrated pulp and the slurry is agitated for a fixed period of time ranging from 1 to 60 minutes. Handsheets are made essentially according to the TAPPI standard T205 with the following exceptions:

(1) the sheet is formed on a polyester wire and dewatered by suction rather than pressing;

(2) the embryonic web is transferred by vacuum to a polyester papermaking fabric;

(3) the sheet is then dried by steam on a rotary drum drier.

b. Testing 1. 11.33 cm (4.5 inch) wide by 10.16 cm (4 inch) long strips of fibrous structure or sanitary tissue product to be tested are prepared. 2.54 cm (1 inch) wide sample strips are cut from the fibrous structure or sanitary tissue product.

2. In a conditioned room where the temperature 23±3° C. (73±4° F.) and relative humidity 50±10% a sample strip [2.54 cm (1 inch) wide] is mounted onto an electronic tensile tester, an EJA Tensile Tester Model No. 1376-18 commercially available from Thwing Albert Instrument Company. The tensile tester is operated at a crosshead speed of 2.54 cm/minute (1 inch/minute). The tensile device is fastened in the lower clamp of the tensile tester such that the horizontal rod was parallel to the clamp faces and is otherwise symmetrically located with respect to the clamps. The position of the lower clamp is adjusted so that the horizontal axis of the rod was exactly 1" (2.54 cm) below the upper clamp.

3. A liquid container is filled to ⅛" (0.3175 cm) from the top of the container with standard tap water which contains 23 ppm calcium ion, 7 ppm magnesium ion and 67 ppm sodium bicarbonate. The sample strip being measured is threaded under the rod in the wet tensile device. The ends of the sample strip are placed together, the slack is removed and the upper clamp fastened. The sample strip is centrally located with respect to the horizontal rod and the upper clamp. The liquid container is raised immersing the looped end of the sample strip to a depth of at least ¾" (1.9 cm). Exactly 5 seconds after the liquid container is raised in place and with the liquid container remaining in place the tensile tester was engaged. The load is recorded. Wet tensile is expressed in g/in (g/2.54 cm) units.

$$\text{Average Wet Tensile (g/in)} = \frac{\text{sum of loads at peak for test runs}}{2 \times \text{number of tensile strips tested}}$$

Wet Tensile is calculated for machine direction (MD) and cross-machine directon (CD). Total Wet Tensile (TWT)= Avg. Wet Tensile (MD)+Avg. Wet Tensile (CD)

4. Next, a sample strip is clamped to the Intelect 500 as described above in Step 3. The liquid container is raised to its uppermost position immersing the looped end of the specimen to a depth of at least ¾" (1.9 cm) in the standard tap water. 5 minutes after the liquid container is raised in place the wet tensile load is again read.

$$\% \text{ Decay} = \frac{(TWT\ 5\ \text{sec soak} - TWT\ 5\ \text{min soak})}{TWT\ 5\ \text{sec soak}} \times 100$$

5. Step 4 is repeated except that the sample strip is immersed in the standard tap wate for 30 minutes rather than 5 minutes. The % Decay is calculated as follows:

$$\% \text{ Decay} = \frac{(TWT\ 5\ \text{sec soak} - TWT\ 30\ \text{min soak})}{TWT\ 5\ \text{sec soak}} \times 100$$

To illustrate nonlimiting embodiments of the present invention, handsheets containing the temporary wet strength resins of Examples I-V and a prior art temporary wet strength additive, Parez® (Bayer Chemicals), were prepared as described herein and tested for initial wet tensile and % Decay as described in the Decay Test Method. Results are presented below:

| Wet Strength Additive | Usage Rate (lbs./ton) | Initial Wet Tensile (g/in) | Wet Tensile Decay (%) | |
|---|---|---|---|---|
| | | | 5 min | 30 min |
| Parez ® | 7 | 71 | 38 | 67 |
| Example I | 2 | 107 | 60 | 84 |
| Example II | 4 | 98 | 60 | 78 |
| Example III | 2 | 80 | 63 | 81 |
| Example IV | 2 | 83 | 67 | 85 |
| Example V | 2 | 71 | 44 | 68 |
| Example VI | 5 | 132 | 74 | 87 |

All documents cited in the Detailed Description of the Invention are, in relevant part, incorporated herein by reference; the citation of any document is not to be considered as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A temporary wet strength additive that exhibits a Tg of less than about 100° C. wherein the temporary wet strength additive comprises an acrolein-free polymer backbone comprising two or more different monomeric units wherein at least one of which comprises a co-crosslinking monomeric unit and at least one of which comprises a homo-crosslinking monomeric unit comprising a hydroxyl moiety, wherein the temporary wet strength additive has the following formula:

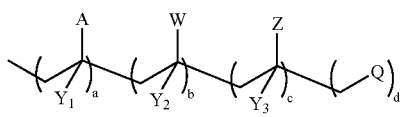

wherein: A is:

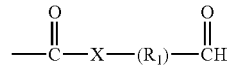

Z is:

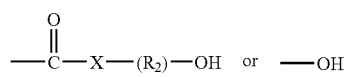

and X is —O—, —NH—, or NCH$_3$—, and R$_1$ and R$_2$ are substituted or unsubstituted aliphatic groups: Y$_1$, Y$_2$, and Y$_3$ are independently —H, —CH$_3$, or a halogen; Q is a cationic monomeric unit; and W is a non-nucleophilic moiety or a nucleophilic moiety that does not form a stable covalent bond with the electrophilic moiety, wherein the mole percent of a is from about 1% to about 47%, the mole percent of b is from about 0% to about 70%, the mole percent of c is from about 10% to about 90%, and the mole percent of d is from about 1% to about 40%; and said temporary wet strength additive has a weight average molecular weight of at least about 70,000, wherein the monomeric unit comprising Z is selected from the group consisting of 2-hydroxyethyl acrylate, 2-hydroxyethyl methacrylate, 4-hydroxybutyl acrylate, glyceryl mono-methacrylate, glyceryl mono-acrylate, 2-hydroxypropyl acrylate, 2-hydroxypropyl methacrylate, 3-hydroxypropyl acrylate, 3-hydroxypropyl methacrylate, 4-hydroxybutyl methacrylate, diethylene glycol mono-methacrylate, N-2-hydroxyethyl methacrylamide, N-(2-hydroxypropyl) methacrylamide, and acrylamidotrishydroxymethylmethane.

2. The temporary wet strength additive according to claim 1 wherein said weight average molecular weight of from about 70,000 to about 400,000.

3. The temporary wet strength additive according to claim 1 wherein a is from about 5% to about 30%, b is from 0% to about 60%, c is about 30% to about 80%, and d is about 2% to about 20%.

4. The temporary wet strength additive according to claim 1 wherein A is

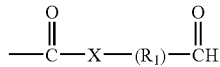

and R$_1$ comprises a C$_2$-C$_7$ aliphatic chain.

5. The temporary wet strength additive according to claim 1 wherein the monomeric unit comprising W is selected from the group consisting of vinyl pyrrolidones, vinyl oxazolidones, vinyl imidazoles, vinyl imidazolines, N,N-dialkyl acrylamides, alkyl acrylates, and alkyl methacrylates.

6. The temporary wet strength additive according to claim 1 wherein the monomeric unit comprising W is a vinyl pyrrolidinone, the monomeric unit comprising Z is 2-hydroxyethyl acrylate, and the monomeric unit comprising A is selected from N-(2,2-dimethoxyethyl)-N-methyl acrylamide, methacrolein, 3,3-dimethyoxypropyl acrylamide, 3,3 diethoxypropyl acrylamide, 3,3-dimethoxypropyl methacrylamide, 2,2 dimethoxy-1-methylethyl acrylate, 3,3-dimethoxypropyl methacrylate, 2-(acryloylamino)ethanal dimethylacetal, 2-(methacryloyl-amino)propanal dimethyl acetal, 5-(acryloylamino)pentanal dimethylacetal, 8-(acryloyl-amino)octanal dimethylacetal, and 3-(N-acryloyl-N-methylamino)propanal dimethyl acetal.

7. A fibrous structure comprising a temporary wet strength additive according to claim 1.

8. The fibrous structure according to claim 7 wherein the fibrous structure comprises from about 0.005% to about 5% by weight of the fibrous structure of the temporary wet strength additive.

9. A single- or multi-ply sanitary tissue product comprising a fibrous structure according to claim 7.

10. A surgical garment comprising a fibrous structure according to claim 7.

11. A process for making a fibrous structure comprising the steps of:
   a) providing a fiber furnish;
   b) depositing the fibrous furnish on a foraminous forming surface to form an embryonic fibrous web;
   c) drying the embryonic fibrous web such that the fibrous structure is formed; and
   d) applying a temporary wet strength additive according to claim 1.

12. A process for making a sanitary tissue product comprising the steps of:
   a) providing a fibrous structure in accordance with claim 7; and
   b) converting the fibrous structure into a sanitary tissue product.

13. A method for making a temporary wet strength additive comprising the steps of:
   a) providing a co-crosslinking monomeric unit and a homo-crosslinking monomeric unit; and
   b) polymerizing the monomeric units from a) to form a temporary wet strength additive according to claim 1.

* * * * *

UNITED STATES PATENT AND TRADEMARK OFFICE
CERTIFICATE OF CORRECTION

PATENT NO. : 7,258,763 B2
APPLICATION NO. : 10/958016
DATED : August 21, 2007
INVENTOR(S) : Robert Lee Barcus et al.

It is certified that error appears in the above-identified patent and that said Letters Patent is hereby corrected as shown below:

In Col. 10, line 35, the word "homo-crosslin" should be homo-crosslinking.

Signed and Sealed this

Thirtieth Day of September, 2008

JON W. DUDAS
*Director of the United States Patent and Trademark Office*